F. LOOS.
APPARATUS FOR REGULATING AND CONTROLLING THE SPEED OF MOTOR VEHICLES.
APPLICATION FILED MAY 6, 1907.
927,865.
Patented July 13, 1909.
4 SHEETS—SHEET 1.
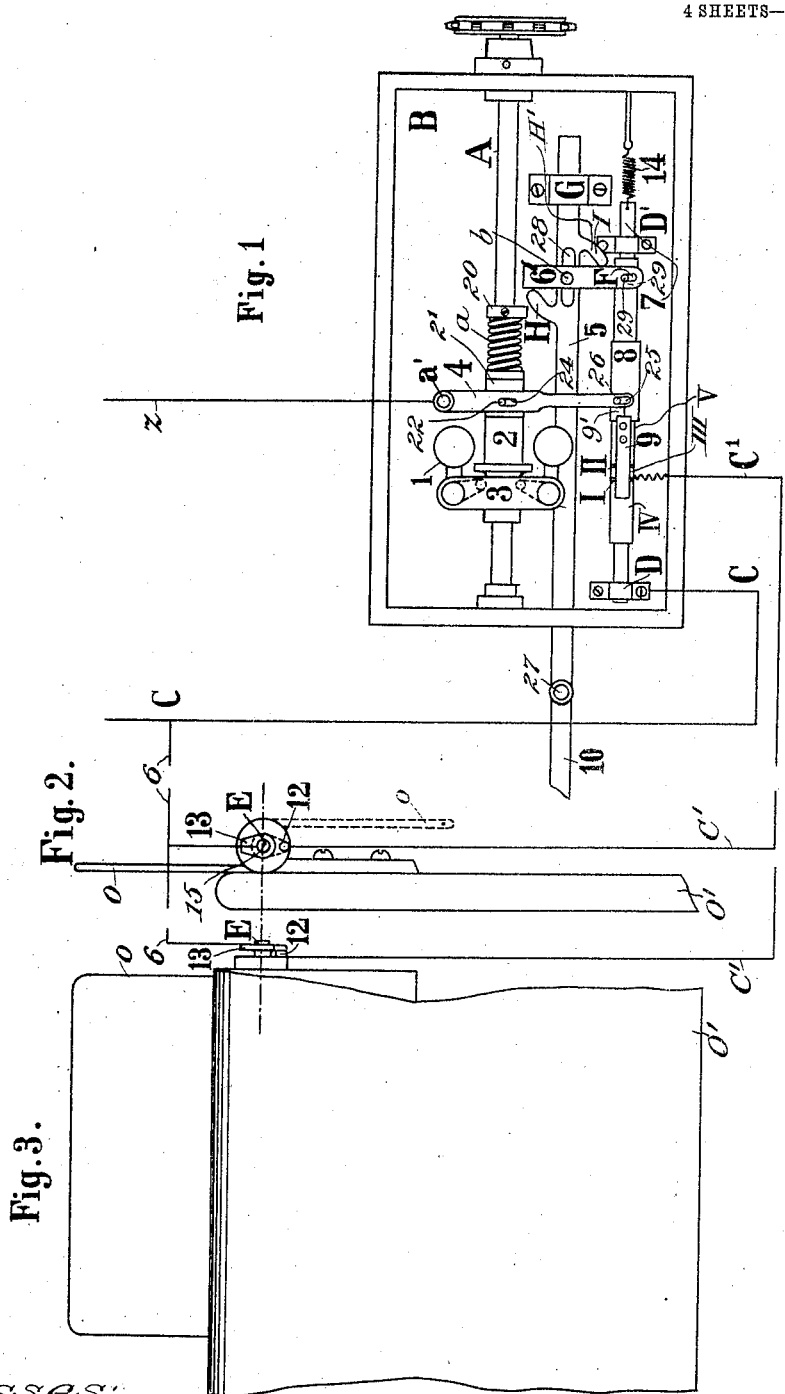

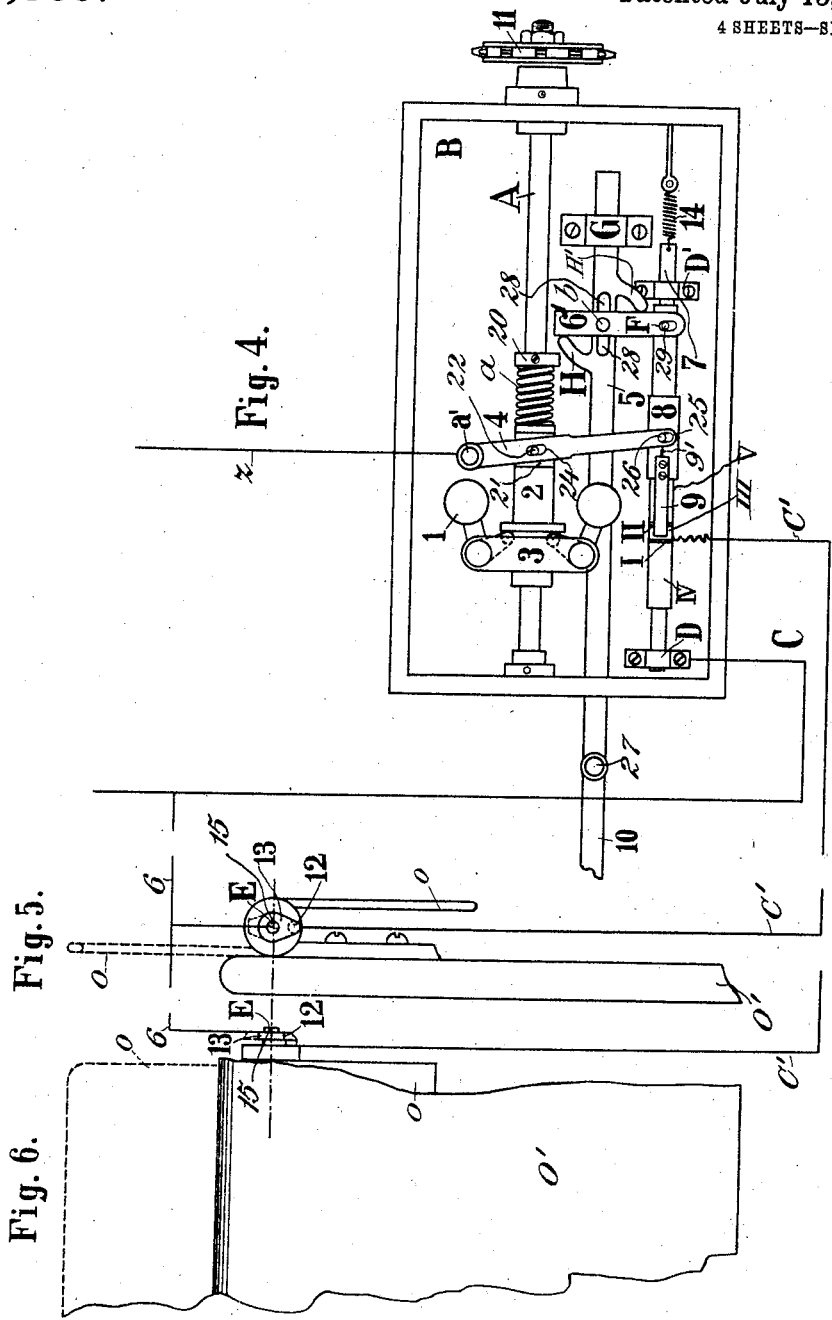

F. LOOS.
APPARATUS FOR REGULATING AND CONTROLLING THE SPEED OF MOTOR VEHICLES.
APPLICATION FILED MAY 6, 1907.

927,865.

Patented July 13, 1909.
4 SHEETS—SHEET 3.

Witnesses:
C. M. Crawford
Ira J. Morgenthal

Inventor:
Franz Loos
by B. Singer
Attorney.

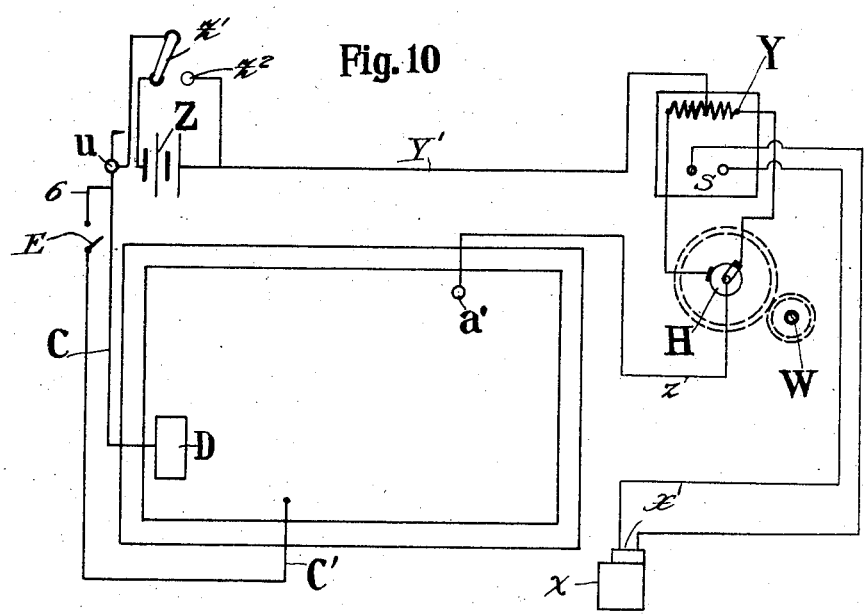
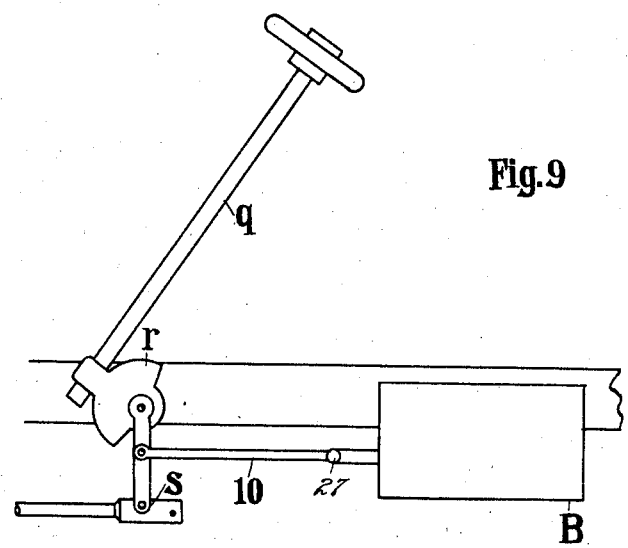

UNITED STATES PATENT OFFICE.

FRANZ LOOS, OF MEIERHÖFEN, NEAR CARLSBAD, AUSTRIA-HUNGARY, ASSIGNOR OF ONE-HALF TO AUGUST GOTTL, OF FISCHERN, NEAR CARLSBAD, AUSTRIA-HUNGARY.

APPARATUS FOR REGULATING AND CONTROLLING THE SPEED OF MOTOR-VEHICLES.

No. 927,865.      Specification of Letters Patent.      Patented July 13, 1909.

Application filed May 6, 1907. Serial No. 372,193.

*To all whom it may concern:*

Be it known that I, FRANZ LOOS, a citizen of Austria-Hungary, and residing at Meierhöfen, near Carlsbad, in the Kingdom of Bohemia, Austria-Hungary, have invented certain new and useful Improvements in Apparatus for Regulating and Controlling the Speed of Motor-Vehicles, of which the following is a specification.

This invention relates to improvements in means for controlling and limiting the speed of automobiles and the object of the invention is to provide controlling means whereby the sparking devices may be cut into or out of operative relation, automatically by the steering mechanism, or at the will of the operator and without directly altering the adjustment of the sparking device.

A further object of the invention consists in the provision of an indicator adapted for operation by the driver of the automobile and serving when in its various positions to indicate to the public whether or not the speed of the automobile is within the prescribed limits of the territory through which it is passing.

The invention has other features which will be more fully described in connection with the accompanying drawings and will be more particularly pointed out and ascertained in and by the appended claims.

Figure 7:
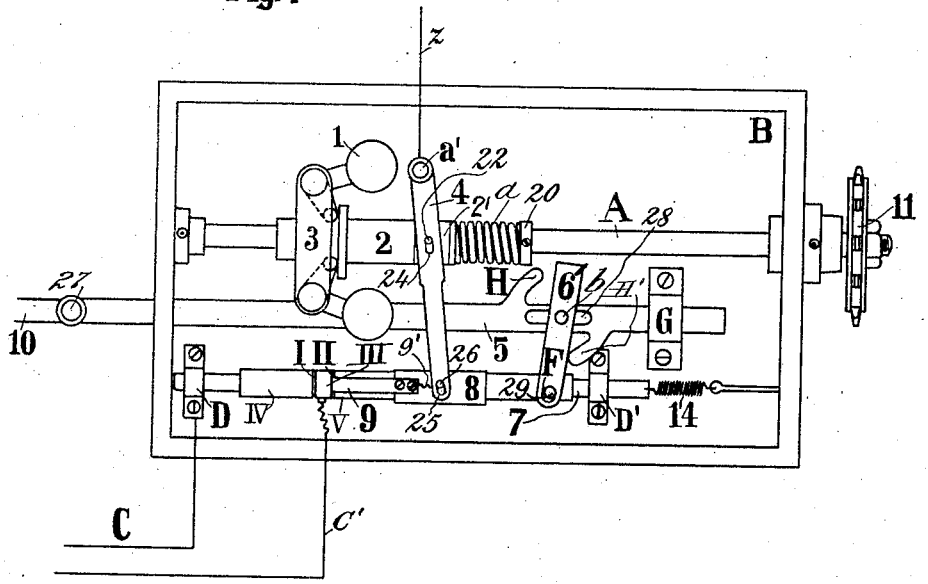
Figure 8:
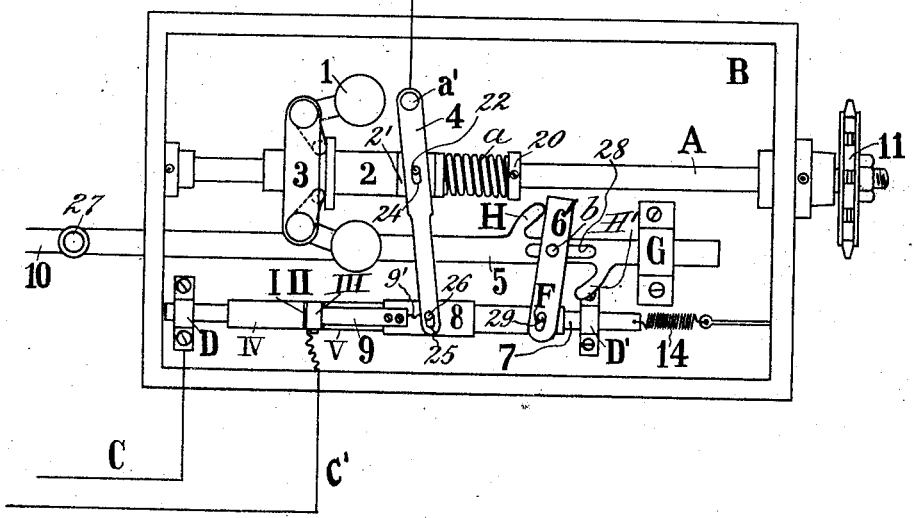
Figure 11:
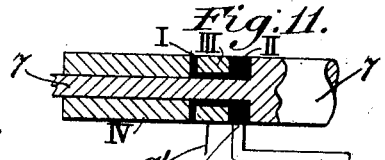

In the drawings:—Figure 1 is a view in side elevation of the controlling mechanism as the parts appear when the vehicle is in a position of rest. Fig. 2 is an end view of the indicator device showing the same in full lines in a non-operating or cut-out position and in dotted lines in an operative or cut-in position. Fig. 3 is a side elevation of the indicator. Fig. 4 is a view similar to Fig. 1 showing the parts in the position which they would assume when the vehicle is going at a high speed. Figs. 5 and 6 are views similar to Figs. 2 and 3 with the indicator shown in full lines in a cut-in position and in dotted lines in a cut-out position. Fig. 7 is a view similar to Fig. 1 showing the parts in the position they assume when the vehicle is running at a high speed and when it has been cut out by the steering mechanism, in rounding a curve in one direction. Fig. 8 is a view similar to Fig. 7 showing the manner of cutting out when the vehicle is rounding in another direction. Fig. 9 is a view of the steering mechanism showing the manner in which the device of my invention is connected therewith. Fig. 10 is a diagrammatic view of the circuits employed and the manner in which the same are connected. Fig. 11 is a detail of a portion of the controller mechanism.

Like characters of reference designate similar parts throughout the different figures of the drawings.

Referring briefly to Fig. 10 the main circuit is shown as consisting of the wire C leading from D through a main switch U to one pole of a battery or other source of current Z. From the other pole of the battery Z a wire Y' is connected with an induction coil Y which latter is connected in the usual manner with the commutator H of the magnet which is driven by shaft W. The commutator H is connected by a line $z$ with $a'$. $x$ designates the engine; the sparker $x'$ thereon is connected with the secondary terminals S of the induction coil. $a'$ and D are the two points of connection of the main circuit with the controlling mechanism and the current passes from $a'$ to D through the controlling mechanism under some adjustments thereof. An auxiliary circuit comprises a wire C' connected with the controlling mechanism and extending through the cut-out E, hereinafter described, from which it is connected with the wire C by branch 6. In some adjustments of the device current will flow from $a'$ to C' and through branch 6 to wire C. When it is desired to use the magneto and cut out the battery a switch Z' is provided and will be thrown into engagement with contact Z³ to cut out the battery. In starting the machine where it is desired to use the battery and not the magneto or when the magneto is disabled the switch Z' will be thrown into the position shown in full lines in Fig. 10 to cut in the battery.

I will next describe the controlling mechanism with reference to Figs. 1 to 8 inclusive and 11. A driven shaft A extends through and has bearings in the end walls of a casing B and is provided on its projecting ends with a sprocket wheel 11 to which power may be applied from any suitable source. The shaft A is provided with a governor 3 having balls 1 which latter are connected with a non-rotatably and slidably mounted sleeve 2. As the balls 1 contract and expand the sleeve 2 is shifted in accordance with the movement of the balls 1 as will be clearly obvious by reference to the hereinbefore mentioned figures. Shifting movement of the sleeve 2 to the right is effected by the balls 1 against the action of the spring a, interposed between the sleeve 2 and a collar 20 adjustable on the shaft A by means of set screws shown. A lever 4 is pivotally mounted at a', which is one of the connecting points of the main circuit by means of wire Z, and said lever 4 is operatively connected with the sleeve 2 so as to be actuated thereby in its shifting movement and as shown said connection consists of a pin 22 on the sleeve 2 projecting through the slot 24 of the lever 4. The sleeve 2 is provided with an insulated portion 2' to prevent short circuiting through sleeve 2 and shaft A. A shiftable contact carrier is provided and as shown the same consists of a rod 7 slidably mounted in bearings D and D'. A spring 14, connected with said carrier and with the casing B, normally maintains said carrier at and returns it to the normal position shown in Fig. 1. Said carrier 7 is provided with a high speed contact III which is insulated at I from a low speed contact IV and is insulated at II from a neutral or non-acting portion V. A sliding contact member 9, preferably in the form of a spring, closing circuit through said high speed contact III and said low speed contact IV with the auxiliary and main circuits respectively and said sliding contact 9 is preferably mounted upon a sleeve 8 of insulating material which is slidably disposed upon the carrier 7. The lever 4 is connected with the sleeve 8 by a slot and pin connection 25 and 26 respectively and the lever 4 is also electrically connected by 9' with the sliding contact 9. The balls of the governor expand as the result of the high speed at which the automobile is driven, the sleeve 2 is shifted to the right and the lever 4 shifts the sliding contact spring 9 from the position shown in Fig. 1, where the contact 9 is in engagement with the low speed contact IV, to the position shown in Fig. 4 where the contact 9 is in engagement with the high speed contact III. When the spring 9 closes circuit through contact portion IV current passes from a' through arm 4 and spring 9 to contact IV and out through bearing D to wire C and from thence to the main circuit as hereinbefore described. This adjustment is shown in Fig. 1. When spring 9 is in engagement with the high speed contact portion III the current passes through arm 4 to spring 9 and out through contact portion III to wire C' and through the auxiliary circuit.

The indicating device consists of a board O which may be hinged to the front or dash board O' of the automobile and which is adapted to be swung into upper and lower positions as clearly shown in full and dotted lines in Fig. 2. A cut-out is associated with the board O and is diagrammatically shown in connection therewith and said cut-out consists of a terminal 12 to which the wire C' is connected and a switch portion 13 to which the branch 6 is connected at 15. When the board O is in an upright position as shown in Fig. 2 in full lines the switch portion 13 is out of engagement with the terminal 12 and the auxiliary circuit is open and when the board O is in a lower position as shown in dotted lines the switch portion 13 engages the terminal 12 and the auxiliary circuit is closed. The board O may have any suitable designating characters (not shown) for indicating the speed or indicating that the automobile is driven at the prescribed or lawful rate of speed so that when the board is in an upper position the face of the board will be visible over the dash-board O' to inspectors or officers of the law and can be readily seen. When the board O is in the position shown in dotted lines in Fig. 2, or in the lowered position, it will be concealed by the dash-board O' and will not be visible and in this position the auxiliary circuit is closed.

As shown in Fig. 11 the end $9^2$ of the spring 9 is wider than the insulated portion I so that it will always overlap the same and never be wholly out of contact with the low and high speed contacts IV and III respectively at the same time as otherwise the sparking circuit would be momentarily put out of service in the passage of the ends $9^2$ over the insulated portion I. The insulated portion II is wider than the end $9^2$ so that normally the spring 9 will never reach the neutral portion V.

Assuming that the parts are in the position shown in Fig. 1 and that the automobile is in a position of rest and about to be started, it will be seen that the board O is in an upward position so as to cut out the auxiliary circuit; therefore the sparking circuit will be completed through a', arm 4, spring 9, contact IV, bearings D, and wire C. If the speed of the automobile is increased beyond the legal rate the balls 1 will expand so as to shift the sleeve 2 and arm 4, and also the sleeve 8 and contact 9, until the latter passes over insulation I to high speed contact III thereby cutting out the main circuit. The sparking apparatus will thus be arrested and the speed of the automobile will immediately decrease until the balls 1 permit the springs a to shift the sleeve 2 and bring the spring contact 9 back into engagement with the speed contact IV. It will thus be seen that automatic means are provided for preventing the speeding of an automobile beyond a predetermined limit and that after the speed has exceeded such limit it will be automatically decreased and the sparking apparatus again started after the prescribed speed is again reached. If however the driver wishes to run at a speed beyond the prescribed limit when he has reached outlying territory where the speed limit does not apply the board O is lowered to the dotted lines shown in Fig. 2, thereby closing the auxiliary circuit. Assuming that the automobile is started in the position shown in Fig. 1 and that the speed is gradually increased it will be seen that when the contact 9 passes over insulation I and engages high speed contact III the main circuit will be cut out but current will pass to the sparking apparatus through the auxiliary circuit by means of wire C', cutout E and branch 6, thereby allowing the increased speed without arresting the sparker.

I will next describe the improved manner by means of which the speed of the automobile is automatically reduced when the same is rounding a curve, this function being performed by means operated from the steering device.

Referring to Fig. 9, q designates a steering post provided with the usual steering wheel and connected within a gear box r with a steering link s. The parts in Fig. 9 are shown in a position to cause the automobile to run in a straight line. When the automobile is rounding a curve to the right or left the link s will be swung forwardly or rearwardly, in accordance with the direction, and with respect to the normal position shown in Fig. 9. A steering cut out member 5 is slidably mounted in one wall of the casing and in a bearing G and is connected at 27 with a link 10 which latter is connected with the steering apparatus shown in Fig. 9. The steering member 5 is provided with means associated with the contact carrier 7 whereby the latter is always shifted in one direction irrespective of the direction in which the member 5 is shifted. As shown a lever 6' is pivotally mounted at b and the pivot b preferably extends through a slot 28 in the member 5. The member 5 is provided with lugs H H', projecting from lateral sides thereof and adapted to engage the lever 6'. It will be seen by reference to Fig. 1 that when the lever 6' is engaged by the lug H and the member 5 is shifted to the right, the lower end of the lever 6' will be shifted to the left and it will also be obvious that when the member 5 is shifted to the left the lug H' will engage the lower end of the lever 6' and shift the same to the left. When the steering gear is in a normal position the member 5 will be in the position shown in Fig. 1 and the lugs H H' will permit the lever 6' to remain in a vertical or normal position. The lever 6' is connected with the carrier 7 by a pin and slot connection 29 and F respectively so that the lever 6' will always shift the carrier 7 to the position shown in Figs. 7 and 8 when the automobile is rounding a curve in either direction. In the position shown in these figures it will be seen that the contact 9 engages the insulation I1 thereby automatically cutting out the auxiliary circuit C' and arresting the sparker. When the steering mechanism is adjusting to drive the vehicle in a straight line, the member 5 will be shifted to the position shown in Fig. 4 and the contact 9 will be restored to engagement with the high speed contact III. It will thus be seen that the sparker is automatically cut out of operation when the automobile is rounding a curve and that it is also automatically cut out of operation when the indicator O is in a cut out position and the vehicle exceeds the prescribed speed limit.

I claim:—

1. A speed regulator for vehicles comprising in combination, a controlling device having main terminals and an auxiliary terminal, a main circuit connected with said main terminals and including a sparker, an auxiliary circuit connected with said main circuit and said auxiliary terminal, an indicator cut out in said auxiliary circuit, and means included in said device for automatically closing circuit to said sparker through said auxiliary or main terminals.

2. A speed regulator for vehicles comprising in combination, a controlling device having main terminals and an auxiliary terminal, a main circuit connected with said main terminals and including a sparker, an auxiliary circuit connected with said main circuit and said auxiliary terminal, means included in said device for closing circuit to said sparker through said auxiliary or one of said main terminals, an indicator cut out for said auxiliary circuit, and independently operable means controlled by the steering gear for cutting out the sparker when the vehicle is rounding a curve.

3. A speed regulator for vehicles comprising in combination, a controlling device having main terminals and an auxiliary terminal, a main circuit connected with said main terminals and including a sparker device, an auxiliary circuit connected with said main circuit and with said auxiliary terminal, a cut out for said auxiliary circuit for opening the same, and means included in said controlling device for opening said main circuit when the vehicle attains a predetermined speed.

4. A speed regulator for vehicles comprising in combination, a controlling device provided with main terminals and an auxiliary terminal, a main circuit connected with said main terminals and including a sparking device, an auxiliary circuit connected with said main circuit and said auxiliary terminal, an indicator cut out for said auxiliary circuit, means included in said controlling device for operating said sparker through said main or auxiliary circuit, and a device operated by the steering gear and actuating said controlling device to cut out the sparker when the vehicle is rounding a curve.

5. A speed regulator for vehicles comprising in combination, a continuously driven shaft, a governor therefor, an arm controlled by said governor and forming one terminal for a main circuit, a movable contact carrier provided with high and low speed contact portions, said carrier forming the other terminal for the main circuit and said high speed contact portion forming one terminal for the auxiliary circuit, a contact member electrically connected with said arm and adapted to close circuit through said high or low speed contact portion, a main circuit connected with said main terminals and including a sparker, an auxiliary circuit connected with said main circuit and said auxiliary terminal, and an indicator cut out for said auxiliary circuit.

6. A speed regulator for vehicles comprising in combination, a driven shaft, a governor therefor, an arm forming one terminal for a main circuit and actuated by said governor, a shiftable contact carrier provided with high and low speed contact portions, bearings for said carrier one of which forms a main contact terminal, said high speed contact portion forming an auxiliary circuit terminal, a contact member electrically connected with said arm and adapted to be shifted thereby into and out of electrical connection with said high and low speed contact portions, a main circuit connected with said main terminals and including a sparker, an auxiliary circuit connected with said main circuit and said high speed contact portion, an indicator cut out for said auxiliary circuit, and means controlled by the steering gear and acting on said contact carrier to automatically cut out the sparker when the vehicle is rounding a curve.

7. A speed regulator for vehicles comprising in combination, a controlling device, a main and an auxiliary circuit connected with said controlling device, said main circuit including a sparking device, means included in said controlling device for closing either of said circuits, and mechanism operated by the steering gear and acting through said means to automatically cut out the sparking device when the vehicle is rounding a curve.

8. A speed regulator for vehicles comprising in combination, a controlling device, a main circuit connected with said controlling device and including a sparker, means included in said controlling device for opening said main circuit to arrest operation of the sparker, and mechanism controlled by the steering gear for automatically coöperating with said controlling device to arrest operation of the sparker when the vehicle is rounding a curve.

In testimony whereof I have affixed my signature in presence of two witnesses.

FRANZ LOOS.

Witnesses:
LUDWIG KOHN,
SIGMUND FREUND.